(12) United States Patent
Hou et al.

(10) Patent No.: US 11,573,784 B2
(45) Date of Patent: Feb. 7, 2023

(54) ELECTRONIC DEVICE FOR UPDATING ON-BOARD DATA OF POWER OFF STATUS AND ELECTRONIC DEVICE PACKAGE ASSEMBLY

(71) Applicant: GIGA-BYTE TECHNOLOGY CO., LTD., New Taipei (TW)

(72) Inventors: Chih-Jen Hou, New Taipei (TW); Hsin-Teng Fu, New Taipei (TW); Ming-Hsun Lee, New Taipei (TW); Shang-Wen Wu, New Taipei (TW); Dee-Lun Tsai, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 346 days.

(21) Appl. No.: 16/706,868

(22) Filed: Dec. 9, 2019

(65) Prior Publication Data

US 2020/0201623 A1   Jun. 25, 2020

(30) Foreign Application Priority Data

Dec. 25, 2018   (TW) .................................. 107147047

(51) Int. Cl.
*G06F 9/44* (2018.01)
*G06F 8/654* (2018.01)
*G06F 1/18* (2006.01)
*G06F 1/26* (2006.01)
*G06F 9/445* (2018.01)

(52) U.S. Cl.
CPC .............. *G06F 8/654* (2018.02); *G06F 1/181* (2013.01); *G06F 1/26* (2013.01); *G06F 9/44589* (2013.01)

(58) Field of Classification Search
CPC ........................................................ G06F 8/654
USPC ........................................................... 717/173
See application file for complete search history.

(56) References Cited

U.S. PATENT DOCUMENTS

| | | | | |
|---|---|---|---|---|
| 5,815,722 A * | 9/1998 | Kalwitz | ................... | G06F 8/60 709/200 |
| 7,549,042 B2 * | 6/2009 | Glaum | .................... | G06F 8/658 713/1 |
| 8,060,670 B2 * | 11/2011 | Yu | ....................... | G06F 13/1684 710/63 |
| 8,271,606 B2 * | 9/2012 | Jewett | ..................... | G06F 21/80 709/215 |
| 9,582,417 B2 * | 2/2017 | Narasimha | ............. | G11C 16/26 |
| 9,793,752 B1 * | 10/2017 | Morales | .................... | G06F 1/30 |
| 9,910,472 B1 * | 3/2018 | Wishman | ................ | H02J 9/061 |
| 10,037,170 B2 * | 7/2018 | Yang | ........................ | G06F 3/067 |

(Continued)

*Primary Examiner* — Francisco J Aponte

(74) *Attorney, Agent, or Firm* — Idea Intellectual Limited; Margaret A. Burke; Sam T. Yip

(57) ABSTRACT

An electronic device for updating on-board data of power off status is provided, which combines a rewritable memory, an embedded controller, and a second network socket onto a motherboard. The rewritable memory includes a target storage area. The embedded controller includes a second network interface electrically connected to the second network socket, for receiving a writing command and a binary file. After receiving power of a standby mode, the embedded controller executes a data writing program to receive the writing command and the binary file via the second network socket and the second network interface, and writes the binary data file into the target storage area of the rewritable memory by using the data writing program.

15 Claims, 14 Drawing Sheets

(56) References Cited

U.S. PATENT DOCUMENTS

| | | | | |
|---|---|---|---|---|
| 10,191,842 B2* | 1/2019 | Karamcheti | ......... | G11C 7/1072 |
| 10,430,263 B2* | 10/2019 | Polar Seminario | ......................... | |
| | | | | G06F 11/1433 |
| 10,671,139 B2* | 6/2020 | Huang | ..................... | G06F 1/263 |
| 10,862,784 B2* | 12/2020 | Kagan | ..................... | H04L 67/28 |
| 10,949,195 B2* | 3/2021 | Just | ......................... | G06F 8/654 |
| 2012/0290860 A1* | 11/2012 | Lin | ........................... | G06F 1/26 |
| | | | | 713/320 |
| 2014/0173187 A1* | 6/2014 | Ali | ........................ | G06F 3/0688 |
| | | | | 711/103 |
| 2014/0237461 A1* | 8/2014 | Kamity | ................... | G06F 8/656 |
| | | | | 717/169 |
| 2014/0309802 A1* | 10/2014 | Monahan | ................. | H02J 9/06 |
| | | | | 700/297 |
| 2016/0011639 A1* | 1/2016 | Ewing | ................... | G06F 1/3246 |
| | | | | 710/110 |
| 2016/0334850 A1* | 11/2016 | Lee | ........................... | G06F 1/30 |
| 2017/0039372 A1* | 2/2017 | Koval | ..................... | H04L 67/06 |
| 2019/0220260 A1* | 7/2019 | Gutman | ............. | G06F 11/1433 |
| 2020/0201623 A1* | 6/2020 | Hou | .......................... | G06F 1/26 |

* cited by examiner

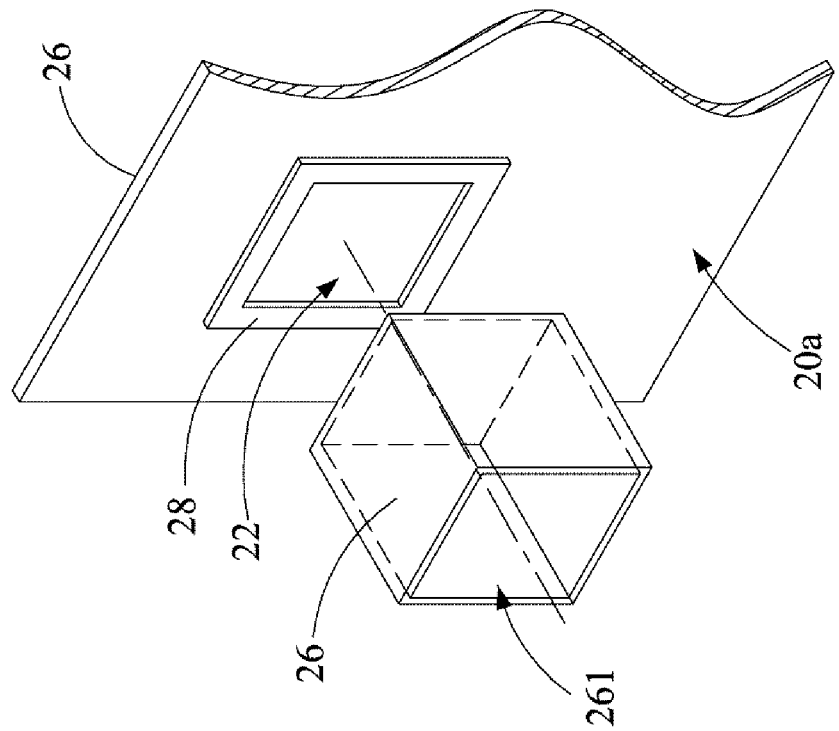
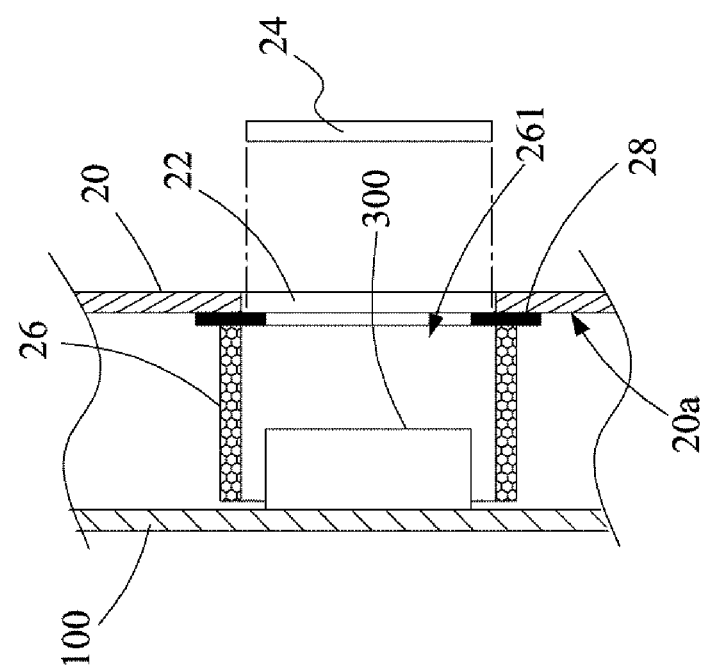
FIG. 8
FIG. 7

| Binary file format (Data writting target) | ▽ | | |
|---|---|---|---|
| Path field of the binary file | File Select | Upload | |
| Confirmw to execute the data writing procedure | OK | Cancel | |
| Data writing result: | | | |

FIG. 12

ELECTRONIC DEVICE FOR UPDATING ON-BOARD DATA OF POWER OFF STATUS AND ELECTRONIC DEVICE PACKAGE ASSEMBLY

CROSS-REFERENCE TO RELATED APPLICATION

This non-provisional application claims priority under 35 U.S.C. § 119(a) to Patent Application No. 107147047 filed in Taiwan, R.O.C. on Dec. 25, 2018, the entire contents of which are hereby incorporated by reference.

BACKGROUND

Technical Field

This disclosure relates to firmware update, and in particular, to an electronic device for updating on-board data of power off status.

Related Art

An electronic device such as a computer host may have a requirement for updating firmware. The firmware is applied to any device that includes a basic input/output system (BIOS), a baseboard management controller (BMC), a complex programmable logic device (CPLD), a power supply unit, a graphics processing unit, or the like.

After the electronic device has been assembled and is packed into a warehouse, if the firmware is required to be updated, the package usually needs to be disassembled, and a central processing unit and a memory have to be installed onto the motherboard. Then, a monitor and an input device (for example, a mouse and an input device) that operate the computer host are connected. Then, a computer is powered on to update the firmware, and then the installed central processing unit, memory, monitor, and input device are removed. The electronic device is re-packed. The foregoing process is time-consuming, and generates additional costs for re-packing.

If the electronic device is only a server, a barebone computer, or a motherboard, in addition to the monitor and the input device, installation of electronic elements such as the central processing unit and the memory further relates to disassembly of a product. As a result, the update process is more complex.

SUMMARY

In the prior art, only after a package is unpacked and necessary peripheral devices are installed, firmware update can be performed on an electronic device to be stored in a warehouse. The foregoing firmware update job is time-consuming, and increases costs of re-packing.

One or more embodiments of this disclosure provide an electronic device for updating on-board data of power off status, including a board, a system electronic circuit, a power connector, and a first network socket. The system electronic circuit is disposed on the board. The power connector is disposed on the board and is electrically connected to the system electronic circuit to receive working power and output standby power. The first network socket is electrically connected to the system electronic circuit.

The electronic device for updating on-board data of power off status further includes at least one rewritable memory, an embedded controller, and a second network socket. The at least one rewritable memory is disposed on the board and includes a target storage area. The embedded controller and the second network socket are disposed on the board. The embedded controller is electrically connected to the rewritable memory and receives the standby power via the power connector. The embedded controller includes a second network interface that is connected to the second network socket to receive a writing command and a binary file.

In at least one embodiment of this disclosure, after receiving standby power, the embedded controller executes a data writing program to receive the writing command and the binary file via the second network socket and the second network interface, and writes the binary file into the target storage area of the rewritable memory by using the data writing program.

In at least one embodiment of this disclosure, before the writing the binary file into the target storage area of the rewritable memory, the embedded controller executes a verification procedure on the binary file to confirm correctness of the binary file.

In at least one embodiment of this disclosure, the binary file at least includes a header, content, a checksum, and a version number.

In at least one embodiment of this disclosure, the embedded controller determines whether the header belonging to the binary file exists to confirm whether a received file is the binary file.

In at least one embodiment of this disclosure, the embedded controller executes a checksum operation on the binary file to determine whether a result of the checksum operation conforms to the checksum of the binary file.

In at least one embodiment of this disclosure, the binary file includes a target identification message corresponding to the rewritable memory.

In at least one embodiment of this disclosure, the embedded controller executes a host end procedure used to allow a client to be connected to the embedded controller via the second network interface and the second network socket to execute the data writing program.

In at least one embodiment of this disclosure, the host end procedure executes a web page service, sets a local connection address, and provides, through the web page service, a menu to be displayed on the client.

In at least one embodiment of this disclosure, the menu is used to allow the client to upload the binary file and the writing command.

In at least one embodiment of this disclosure, after the executing the data writing program, the embedded controller returns, to the client, a data writing result to be displayed in the menu.

In at least one embodiment of this disclosure, the electronic device for updating on-board data of power off status further includes a casing, and a power supply unit.

The power supply unit and the board are installed inside the casing. The power supply unit includes a power socket and an output connector. The power socket is configured to receive external power to be converted into the working power. The output connector is configured to connect to the power connector to output the working power to the power connector. The casing includes at least one window. The first network socket, the second network socket, and the power socket are disposed corresponding to the window and are exposed through the window.

One or more embodiments of this disclosure also provide an electronic device package assembly, including the electronic device as described in the foregoing and a packing box. The packing box is configured to accommodate the electronic device. The packing box includes at least one opening hole. A position of the at least one opening hole corresponds to the second network socket and the power connector.

In at least one embodiment of this disclosure, the electronic device package assembly further includes a sealing element, configured to close the at least one opening hole.

In at least one embodiment of this disclosure, the electronic device package assembly further includes a separation element, provided with a tubular channel. The tubular channel extends from an edge of the opening hole toward the second network socket or the power connector, so that the separation element surrounds the second network socket or the power connector.

In at least one embodiment of this disclosure, the electronic device package assembly further includes a reinforcement element, combined on an inner side surface of the packing box and surrounding the opening hole.

In at least one embodiment of this disclosure, the reinforcement element protrudes in the opening hole along a radial direction of the opening hole.

Through the foregoing electronic devices composed of motherboards, as long as standby power and a network connection are provided, on-board data update can be performed without disassembling the electronic device, especially a computer host that has been assembled. After the electronic device is further combined with a packing box, on-board data update can be performed when the packing box is not unpacked. Therefore, it is helpful for management of the electronic device in stock.

BRIEF DESCRIPTION OF THE DRAWINGS

This disclosure will become more fully understood from the detailed description given herein below for illustration only, and thus not limitative of this disclosure, wherein:

FIG. 7 is a schematic sectional view of a separation element and a reinforcement element according to the second embodiment of this disclosure;

FIG. 8 is a three-dimensional diagram of the separation element and the reinforcement element according to the second embodiment of this disclosure;

FIG. 12 is a schematic view of a menu according to the second embodiment of this disclosure;

DETAILED DESCRIPTION

Figure 1:
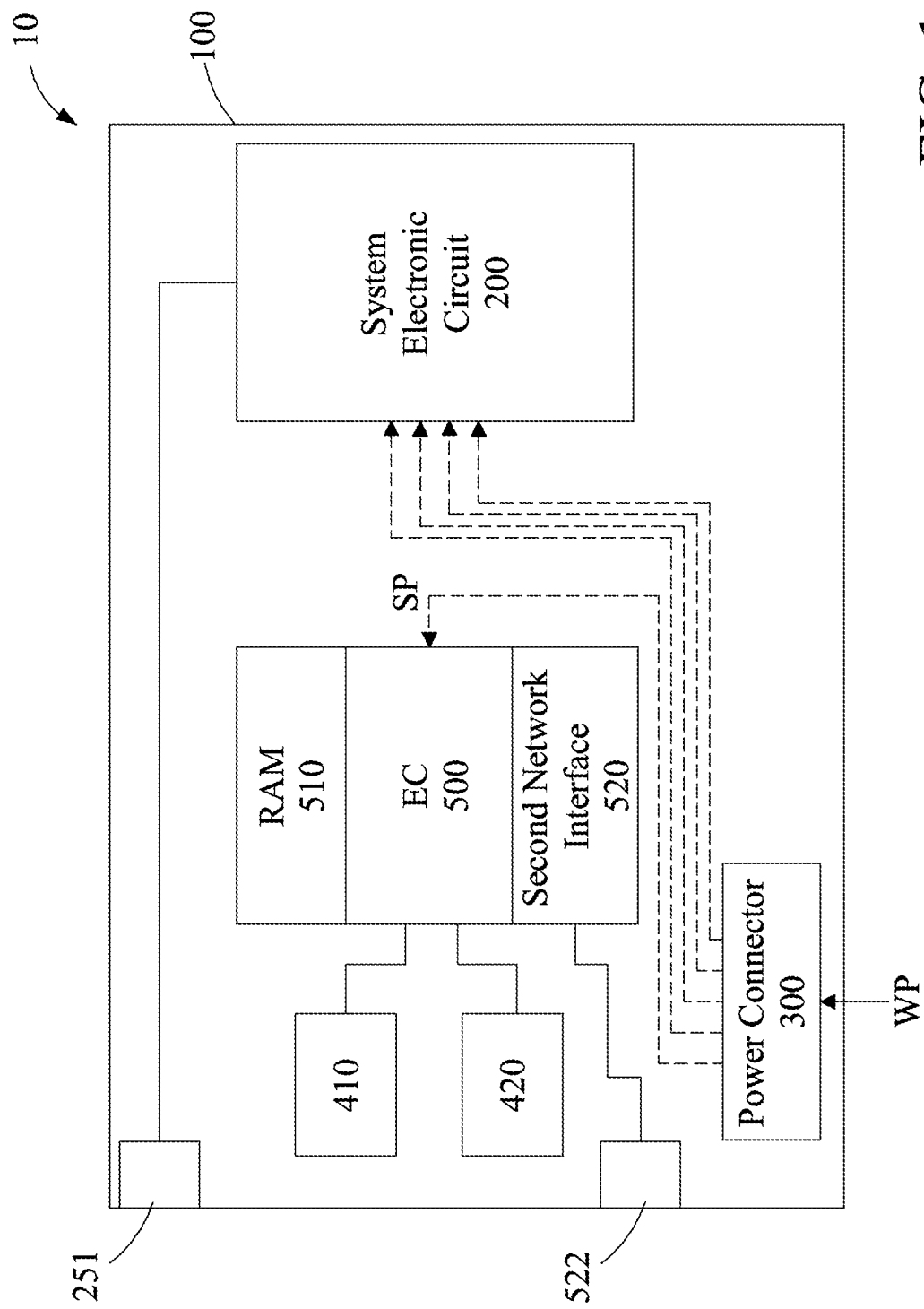
FIG. 1 is a circuit block diagram of an electronic device for updating on-board data of power off status according to a first embodiment of this disclosure.

Referring to FIG. 1, an electronic device for updating on-board data of power off status according to a first embodiment of this disclosure is shown. The electronic device may be a motherboard, a server, a computer, or a barebone computer. A motherboard 10 is used as an example to describe the electronic device in the first embodiment. The motherboard 10 includes a board 100, a system electronic circuit 200, a power connector 300, a first network socket 251, one or more rewritable memories 410 and 420, an embedded controller 500 (EC 500), and a second network socket 522.

As shown in FIG. 1, the board 100 may be a printed circuit board including a printed circuit to provide an electrical connection. The board 100 does not exclude another form of board, and the electrical connection between various elements is achieved by using wires. The system electronic circuit 200 is disposed on the board 100 to provide a function required by the motherboard 10. The power connector 300 is disposed on the board 100 and is electrically connected to the system electronic circuit 200 to receive working power WP and output standby power SP. An example of the power connector 300 is an ATX 24-pin socket capable of receiving power of different voltages and providing the power to different electronic elements. A dashed line shown in the figure represents a power transmission line.

As shown in FIG. 1, the first network socket 251 is electrically connected to the system electronic circuit 200. The first network socket 251 is configured to connect to a plug of a network cable, so that the system electronic circuit 200 is connected to a network.

As shown in FIG. 1, the rewritable memories 410 and 420 are disposed on the board 100 and the rewritable memories 410 and 420 include a target storage area. The target storage area stores code segment. The rewritable memories 410, 420 are mainly used for an electronic element needing to store firmware. The firmware is the code segment. The electronic element needing to store firmware includes but is not limited to a basic input/output system (BIOS), a baseboard management controller (BMC), a complex programmable logic device (CPLD), a power supply unit, or a graphics processing unit. Varieties of the rewritable memories 410, 420 include but are not limited to an EPROM, an EEPROM, or a flash memory. Therefore, each motherboard 10 may include a plurality of rewritable memories 410, 420 at the same time and needs to perform a firmware update procedure.

Figure 2:
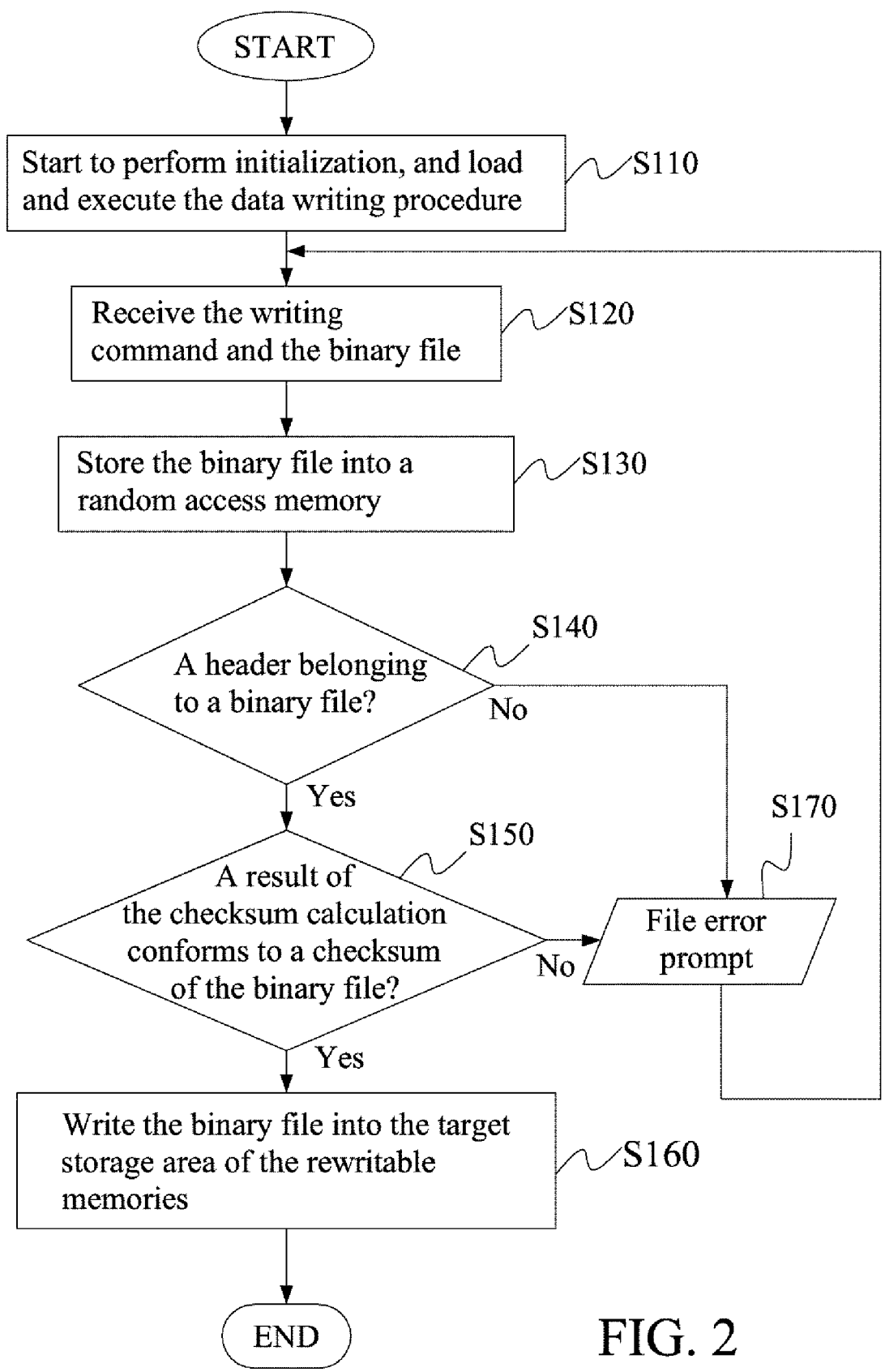
FIG. 2 is a flowchart of a method performed by the electronic device for updating on-board data of power off status according to the first embodiment of this disclosure.

As shown in FIG. 1 and FIG. 2, the embedded controller 500 may be an electronic element having functions of receiving a signal, executing code segment, and outputting a corresponding signal on the motherboard 10, for example, a baseboard management controller (BMC), a keyboard controller, a complex programmable logic device, or another microcontroller. The embedded controller 500 and the second network socket 522 are disposed on the board 100. The embedded controller 500 is electrically connected to the rewritable memories 410, 420 and receives the standby power SP through the power connector 300. The embedded controller 500 includes a second network interface 520. The second network interface 520 is connected to the second network socket 522. The second network interface 520 is also configured to connect to a plug of a network cable, so that the embedded controller 500 is capable of being connected to a network via the second network interface 520. Alternatively, the embedded controller 500 may be directly connected to another device by using a network cable, and establish a communication connection through a network communication protocol (for example, the TCP/IP communication protocol). The embedded controller 500 receives, via the second network socket 522 and the second network interface 520, a writing command and a binary file that are externally input, and writes the binary file into the target storage area of the rewritable memories 410, 420 by using a data writing procedure to overwrite the original code segment (the firmware).

As shown in FIG. 1 and FIG. 2, the embedded controller 500 further stores a data writing program. As shown in step S110, after receiving the standby power SP, the embedded controller 500 starts to perform initialization, and loads and executes the data writing procedure to enter a state of waiting for data writing. Then, as shown in step S120, the embedded controller 500 receives the writing command and the binary file via the second network socket 522 and the second network interface 520. As shown in step S130, after receiving the writing command and the binary file, the embedded controller 500 stores the binary file into a random access memory 510 (RAM 510).

Figure 3:
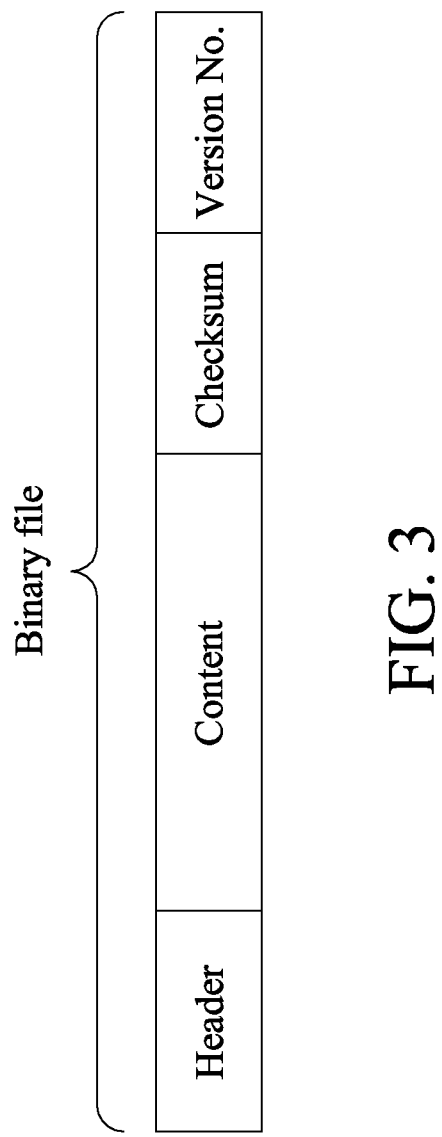
FIG. 3 is a schematic diagram of an encapsulated packet of a binary file according to the first embodiment of this disclosure.

Referring to FIG. 2 and FIG. 3, then, the embedded controller 500 executes a verification procedure on the binary file to confirm correctness of the binary file. As shown in FIG. 3, a file format of the binary file at least includes a header, content, and a checksum. Sometimes, a version number of the binary file is further included. The header is used to confirm that the received file is a usable binary file. Sometimes, the header further includes information of an applicable device, that is, identification information of the rewritable memories 410, 420 that are used as writing targets. The identification information may be further recorded in the version number. The content is information that is expected to be written into the rewritable memories 410, 420, that is, a to-be-written firmware. The checksum is a value that should be obtained after the binary file is calculated through a specific checksum algorithm, and is used to determine whether content of the received file is damaged. Common checksum algorithms include MD5 and SHA1.

The verification procedure is used to determine whether the received file is a binary file. As shown in step S140, the embedded controller 500 reads bytes of a corresponding header, and determines, through information of the bytes, whether a header belonging to a binary file exists to confirm that the received file is a binary file. A case in which the header does not exist includes a fact that the received file is not a binary file, or that the received file is not a binary file applicable to the motherboard 10.

As shown in step S170, if a header of a binary file does not exist, the embedded controller 500 outputs a file error prompt.

If a header of a binary file exists, the received file is determined to be a binary file. As shown in step S150, the embedded controller 500 executes a checksum calculation on the binary file to determine whether a result of the checksum calculation conforms to a checksum of the binary file. As shown in step S170, if the result of the checksum calculation does not conform to the checksum of the binary file, indicating that the content of the binary file is damaged or is error content, the embedded controller 500 also outputs the file error prompt.

As shown in step S160, if the result of the checksum calculation conforms to the checksum of the binary file, indicating that the content of the binary file is correct, the embedded controller 500 executes the data writing procedure by using the data writing program, and writes the binary file into the target storage area of the rewritable memories 410, 420. As shown in the foregoing, a target identification message of specified rewritable memories 410, 420 may be included in the header or the version number. In the electronic device including the plurality of rewritable memories 410, 420, the binary file must be written into the correct rewritable memories 410, 420. Therefore, the binary file must include the target identification message corresponding to the specified rewritable memories 410, 420, to enable the embedded controller 500 to correctly execute writing on the specified rewritable memories 410, 420.

Figure 4:
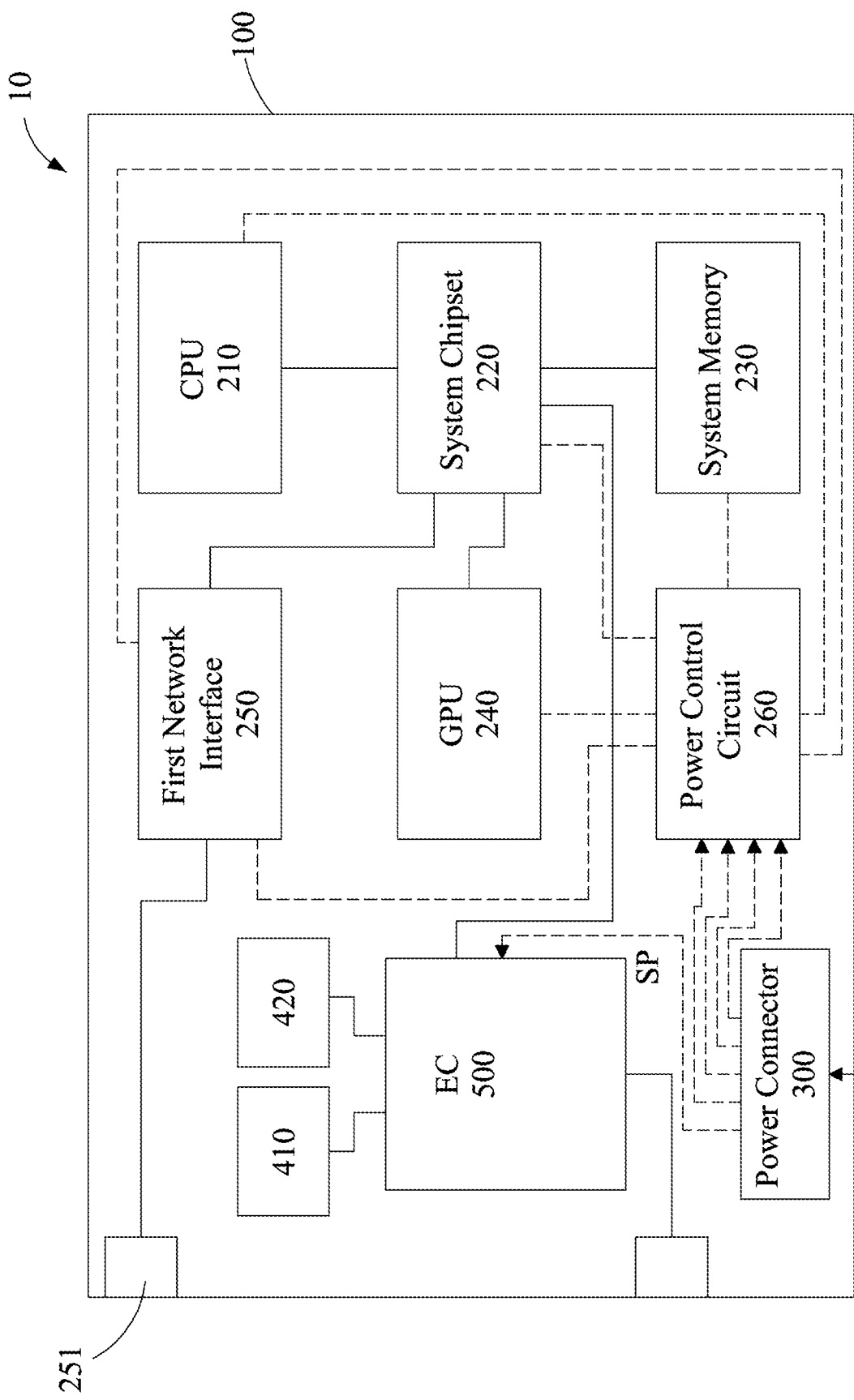
FIG. 4 is another circuit block diagram of the electronic device for updating on-board data of power off status according to the first embodiment of this disclosure.

Referring to FIG. 4, a detailed circuit block diagram of the motherboard 10 in the first embodiment is shown. As described in the foregoing, the system electronic circuit 200 shown in FIG. 4 is configured to provide basic functions of the motherboard 10. The system electronic circuit 200 generally includes a central processing unit 210 (CPU 210), a system chipset 220, a system memory 230, a graphics processing unit 240 (GPU 240), a first network interface 250, a power control circuit 260, and a necessary bus. The system chipset 220 is a circuit chip configured to process an I/O job between the central processing unit 210 and another element, and includes but is not limited to a control hub, a baseboard management controller (BMC), a logic IC being a combination of a Southbridge chip and a Northbridge chip, a platform control hub (PCH), an I/O control hub (ICH), an AMD fusion controller hub, and the like. The system chipset 220 and compositions of the system chipset 220 are not the technical features of this disclosure, and details are not described below. As described in the foregoing, power provided by the power connector 300 may be directly transmitted to different electronic elements, or may be indirectly transmitted to different electronic elements through the power control circuit 260. The power control circuit 260 may be configured to determine whether to supply power, or further perform voltage transformation (for example, transform a direct current to a direct current) and then transmit the power to a target electronic element. The first network socket 251 is electrically connected to the first network interface 250. The first network interface 250 is configured to provide a network connection function, so that the motherboard 10 is provided with an on-board network connection device.

Figure 5:
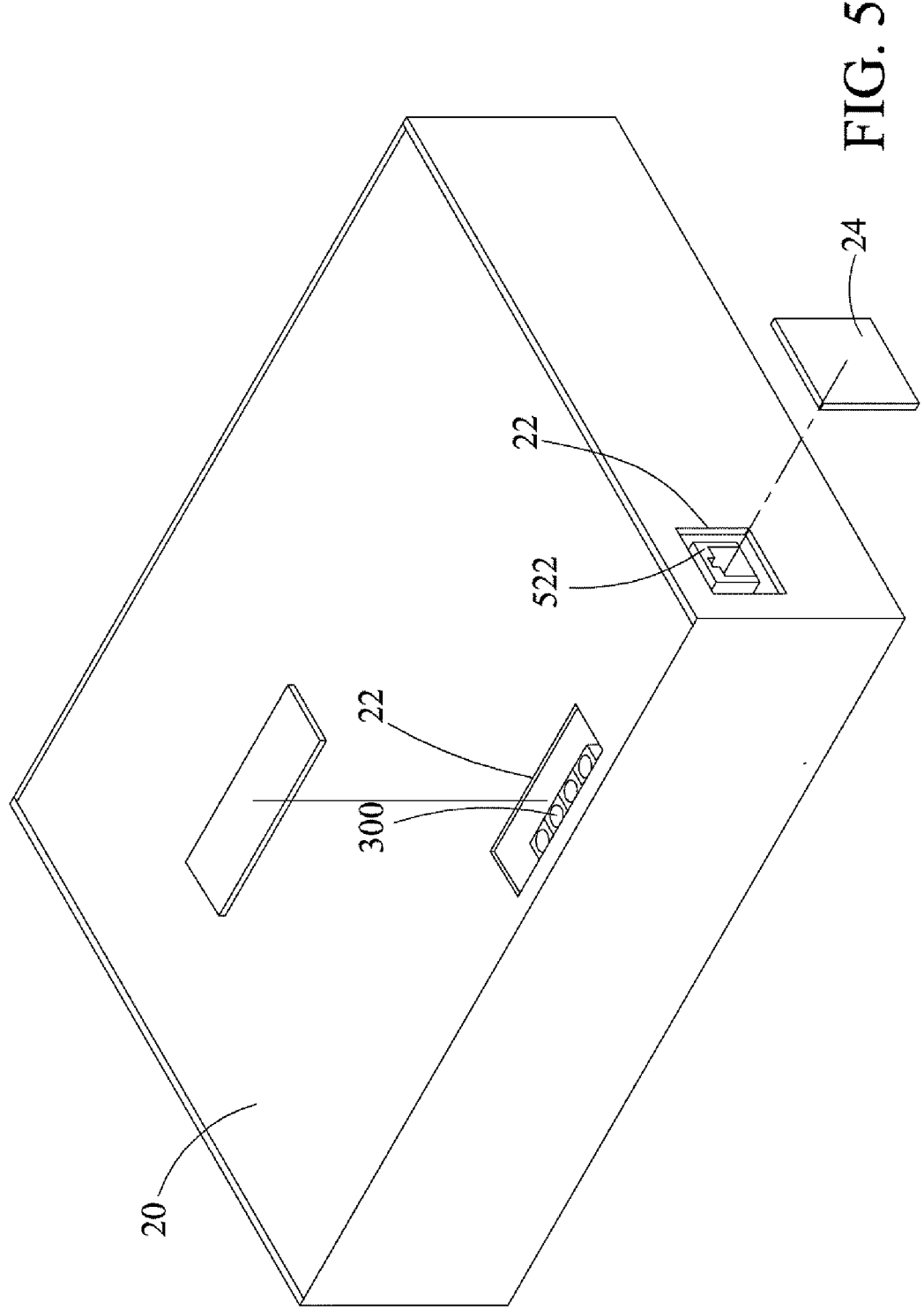
FIG. 5 is a three-dimensional diagram of an electronic device package assembly according to a second embodiment of this disclosure.
Figure 6:
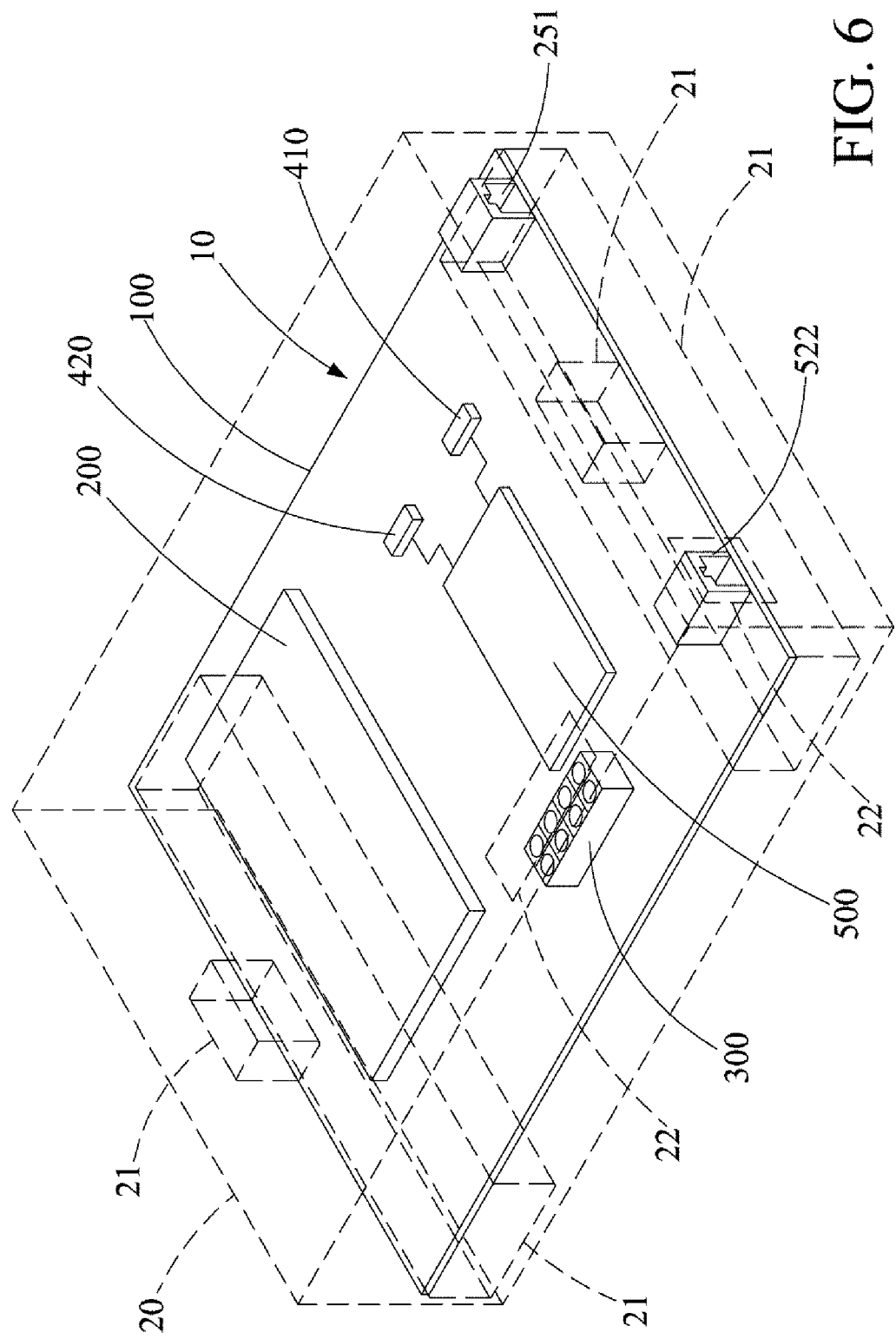
FIG. 6 is another three-dimensional diagram of the electronic device package assembly according to the second embodiment of this disclosure.

Referring to FIG. 5 and FIG. 6, a second embodiment of this disclosure provides an electronic device package assembly, including an electronic device and a packing box 20. A motherboard 10 is used as an example to describe the electronic device in the second embodiment. A system electronic circuit 200, an embedded controller 500, and rewritable memories 410, 420 shown in the figures are simplified examples, and are not used to describe an actual shape of the system electronic circuit 200.

As shown in FIG. 5 and FIG. 6, the packing box 20 is configured to accommodate the electronic device, that is, the packing box 20 accommodates a board 100 of the motherboard 10. The packing box 20 includes at least one opening hole 22. A position of the at least one opening hole 22 corresponds to a second network socket 522 and a power connector 300. In the second embodiment, the packing box 20 includes two opening holes 22. Positions of the opening holes 22 respectively correspond to the second network socket 522 and the power connector 300. If the second network socket 522 and the power connector 300 have close relative positions of and a same insertion direction, it is not excluded that a single opening hole 22 corresponds to both the second network socket 522 and the power connector 300.

Therefore, as shown in FIG. 5, when the packing box 20 wraps the motherboard 10, the second network socket 522 and the power connector 300 are still exposed, so that a network cable and external power EP can be connected. Therefore, when the packing box 20 is not unpacked, the embedded controller 500 still executes the data writing procedure to update firmware of a target electronic element. That is, after the motherboard 10 has been manufactured and is packed, the firmware of the target electronic element is still able to be updated, and the packing box 20 does not need to be unpacked to take out the motherboard 10.

As shown in FIG. 5, in addition, when the data writing job is not required, the opening hole 22 may be closed by using a sealing element 24. The sealing element 24 may be an elastic plug, or a sheet body that is fixed in a pasting manner. As shown in FIG. 6, the packing box 20 may be provided with a buffer element 21 between the electronic device (that is, the board 100) and an inner side surface 20a of the packing box 20 to perform buffer protection on the motherboard 10.

Referring to FIG. 7 and FIG. 8, the packing box 20 further includes a separation element 26 provided with a tubular channel 261. The tubular channel 261 extends from an edge of the opening hole 22 toward the second network socket 522 or the power connector 300, so that the separation element 26 surrounds the second network socket 522 or the power connector 300 (the power connector 300 is used as an example in the figures). The separation element 26 is to enable an external environment to touch only the second network socket 522 or the power connector 300 through the opening hole 22 and not to touch another part of the motherboard 10, thereby reducing a probability that the motherboard 10 is damaged by an object passing through the opening hole 22.

Figure 9:
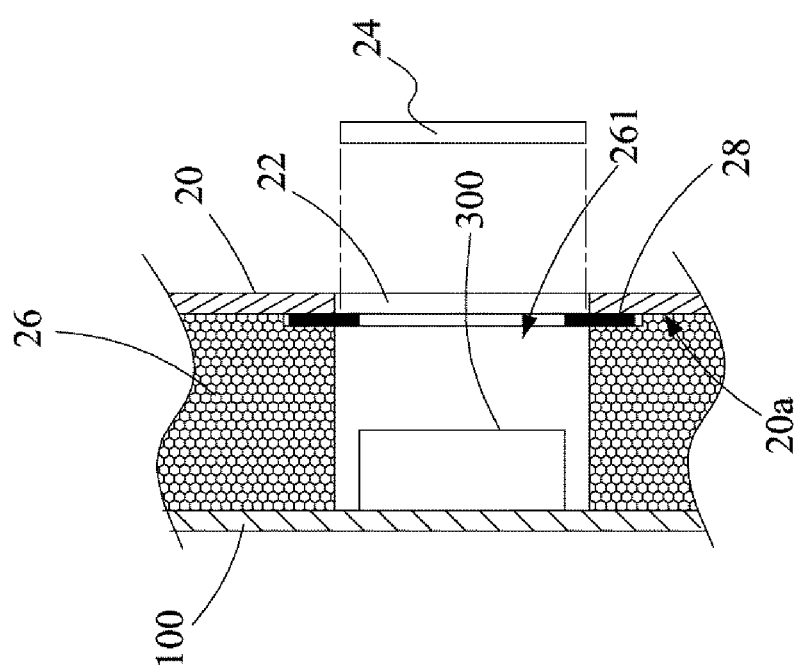
FIG. 9 is another schematic sectional view of the separation element and the reinforcement element according to the second embodiment of this disclosure.

As shown in FIG. 9, although the separation element 26 shown in FIG. 7 and FIG. 8 is of a thin-walled structure, the separation element 26 actually is of a block structure including the tubular channel 261, and is made of a buffer material or is designed with a buffer structure. Moreover, the separation element 26 is disposed between the electronic device (that is, the board 100) and the inner side surface 20a of the packing box 20. In this case, the separation element 26 may serve as the buffer element 21. The tubular channel 261 is reserved for a power cable or a network cable to pass through and to be connected to the second network socket 522 and the power connector 300 outside the packing box 20.

Referring to FIG. 7 and FIG. 8, the packing box 20 further includes a reinforcement element 28, combined on the inner side surface 20a of the packing box 20 and surrounding the opening hole 22. The reinforcement element 28 is configured to strengthen structural strength around the opening hole 22, to avoid insufficient local strength of the packing box 20 due to the opening hole 22. As shown in FIG. 7, an opening of the reinforcement element 28 may be smaller than the opening hole 22, so that an edge of the reinforcement element 28 protrudes in the opening hole 22 along a radial direction of the opening hole 22 to form a flange extending inward. A size and shape of the sealing element 24 may completely match those of the opening hole 22. The sealing element 24 is fixed in a manner of being pasted on an outer side of the reinforcement element 28. Therefore, when the sealing element 24 closes the opening hole 22, an appearance of the packing box 20 is kept flat, and no protruding structure is formed.

Figure 10:
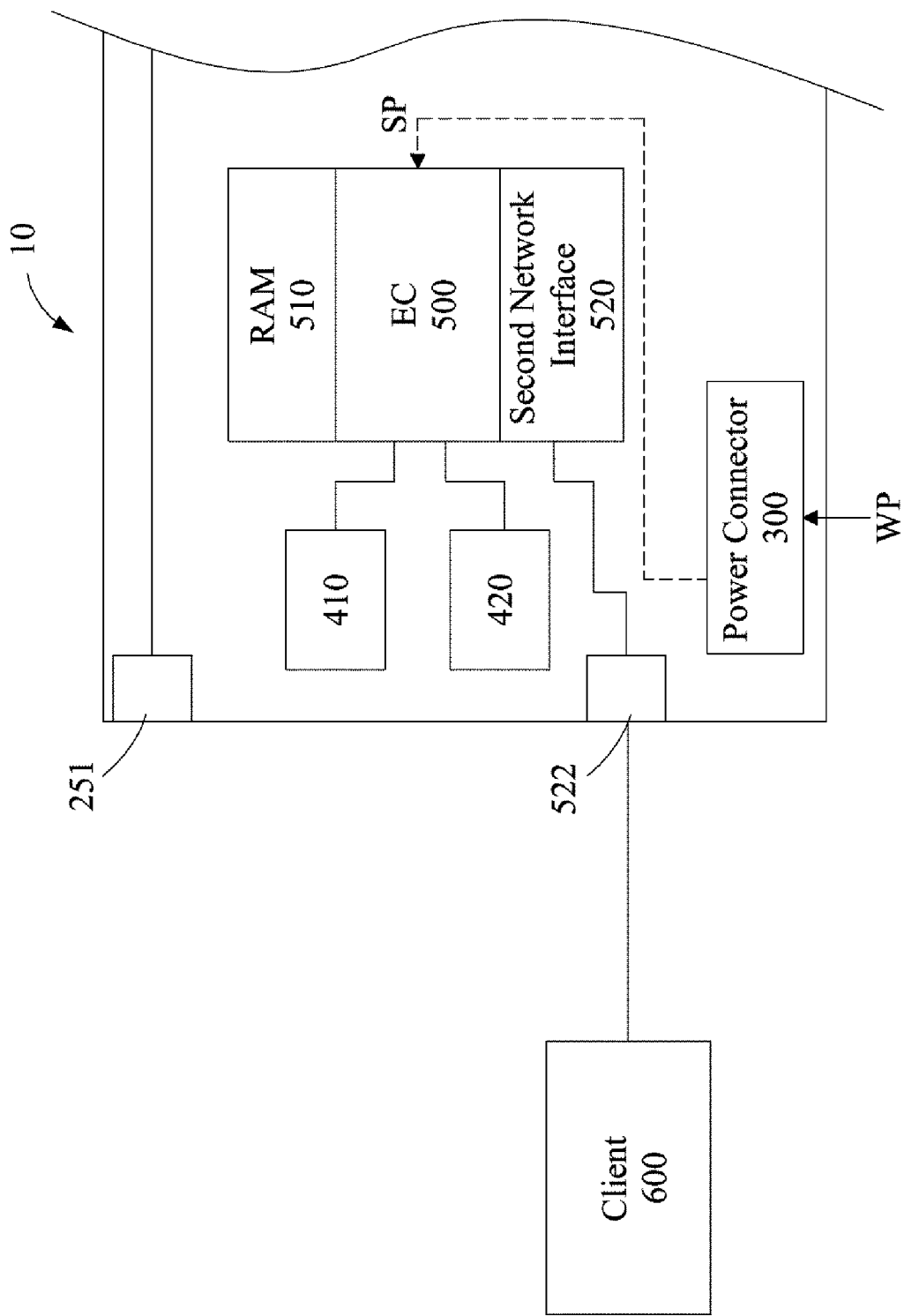
FIG. 10 is a circuit block diagram of the electronic device for updating on-board data of power off status connecting to a client according to the second embodiment of this disclosure.
Figure 11:
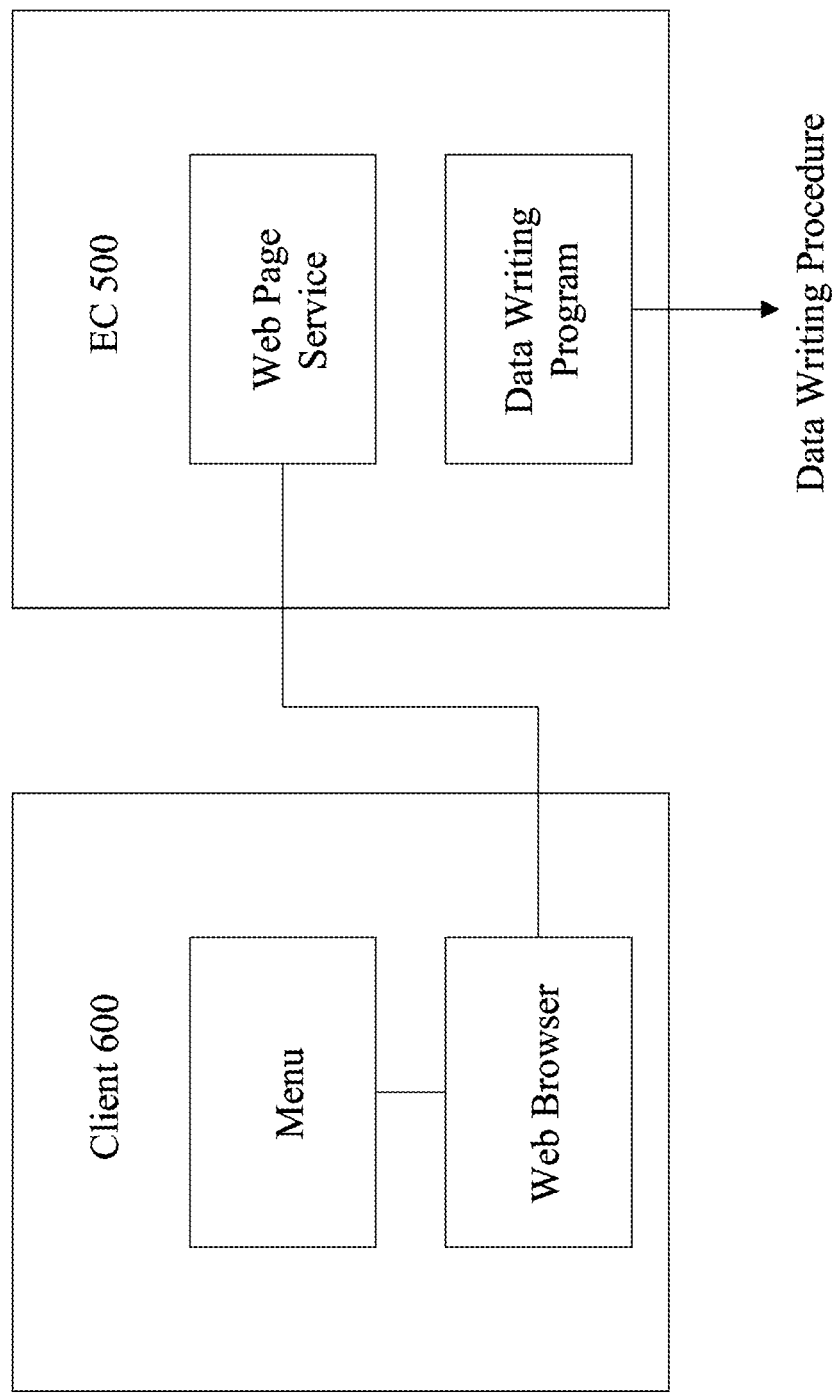
FIG. 11 is a functional schematic diagram of the electronic device for updating on-board data of power off status connecting to the client according to the second embodiment of this disclosure.

Referring to FIG. 10 and FIG. 11, the embedded controller 500 may be directly connected, via the second network interface 520 and the second network socket 522, to a client 600 by using a network cable and establish a communication connection through a network communication protocol. Electronic elements related to the system electronic circuit 200 are omitted in FIG. 9 to simplify the figure.

As shown in FIG. 11, the embedded controller 500 executes a host end procedure used to allow the client 600 to be connected to the embedded controller 500 via the second network interface 520 and the second network socket 522 to execute the data writing procedure. The host end procedure executes a web page service, and sets a local connection address. The client 600 executes a web browser and loads a menu from the web page service of the embedded controller 500. The menu is displayed on the client 600.

FIG. 12 is a menu example. A user may select a binary file format from a pull-down menu, or select one of the rewritable memories 410, 420 as a data writing target. Then, the binary file is selected in a storage device (internally established or externally connected) of the client 600 by using a path field of the binary file. After confirming to execute the data writing procedure, the client 600 receives the writing command and the binary file, and the host end procedure drives, through connection to the web browser of the client 600, the embedded controller 500 to execute the data writing procedure shown in FIG. 2. A data writing result such as a file error prompt or a data writing completion prompt in step S170 may be returned to the client 600 by using the host end procedure and displayed in an execution result field of the menu.

The function of providing the web page service for the client 600 to connect is to execute the data writing job via the client 600. Therefore, the data writing job can be executed to update on-board data without requiring the electronic device to be actually connected to a monitor and an input interface (for example, a keyboard or a mouse) to start up normally.

Figure 13:
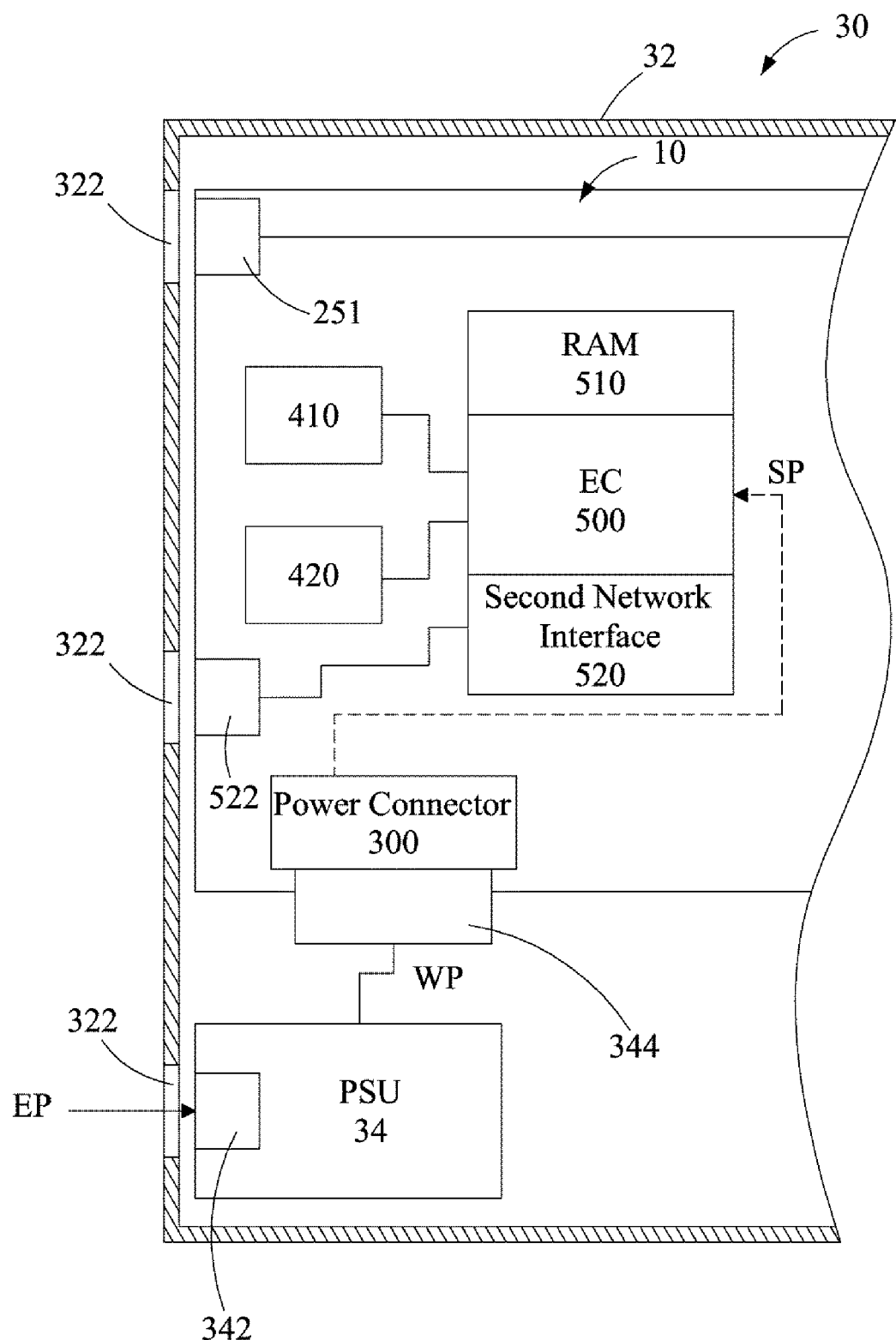
FIG. 13 is a circuit block diagram of an electronic device for updating on-board data of power off status according to a third embodiment of this disclosure.
Figure 14:
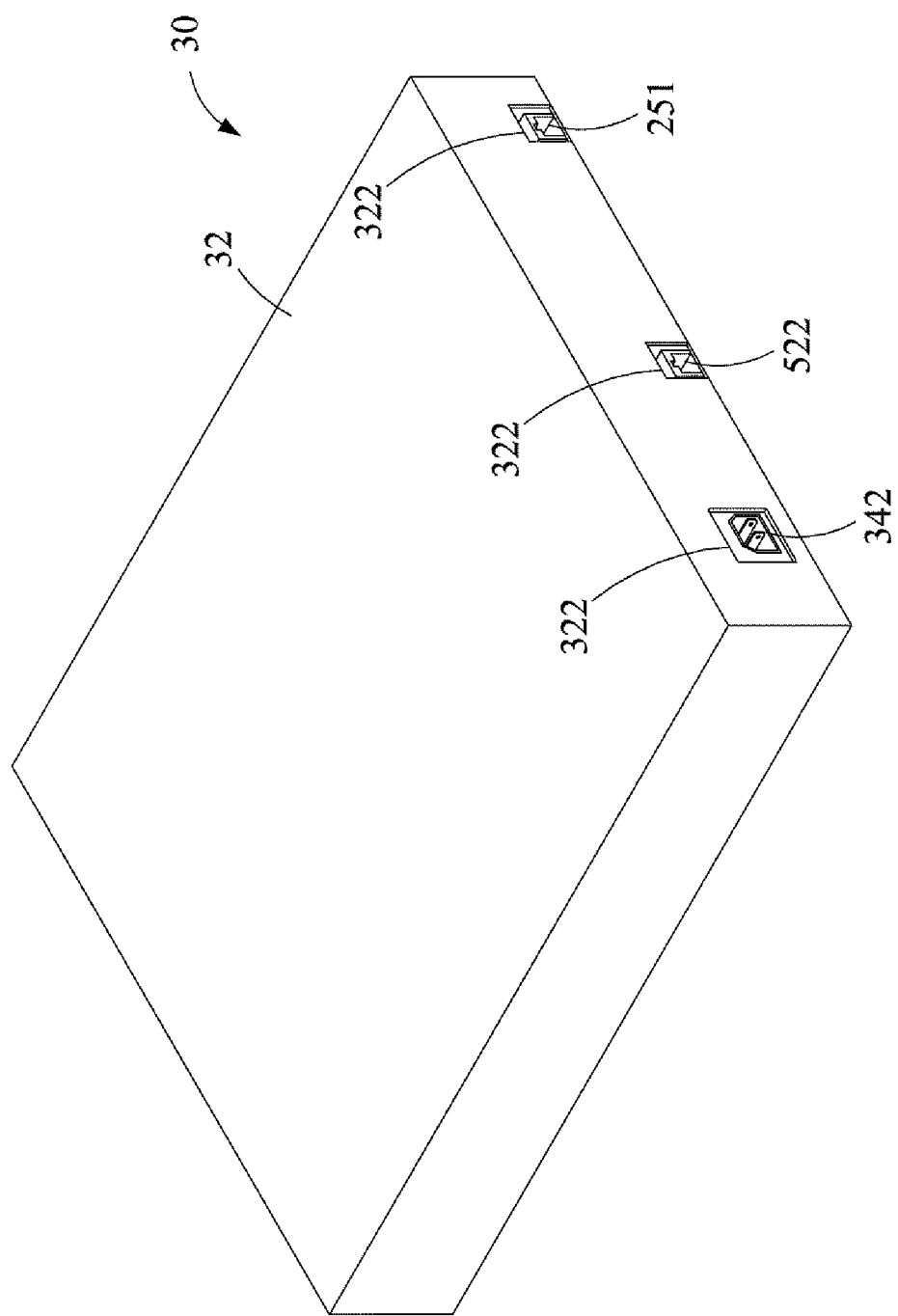
FIG. 14 is a three-dimensional diagram of the electronic device for updating on-board data of power off status according to the third embodiment of this disclosure.

FIG. 13 and FIG. 14 show an electronic device for updating on-board data of power off status according to a third embodiment of this disclosure. A computer host 30 is used as an example to describe the electronic device in the third embodiment. The computer host 30 includes a casing 32, a power supply unit 34 (PSU 34), and a motherboard 10 as that in the first embodiment. The computer host 30 may be a desktop computer, a notebook computer, or a server host having complete functions, or may be a barebone computer.

As shown in FIG. 13 and FIG. 14, the power supply unit 34 and a board 100 of the motherboard 10 are installed inside the casing 32. The power supply unit 34 includes a power socket 342 and an output connector 344. The power socket 342 is configured to receive external power EP and convert the external power EP into working power WP. The output connector 344 is configured to connect to a power connector 300 to output the working power WP to the power connector 300.

As shown in FIG. 12 and FIG. 13, the casing 32 includes one or more windows 322. The power supply unit 34 and the motherboard 10 are installed inside the casing 32, so that the first network socket 251, the second network socket 522, and the power socket 342 are disposed corresponding to the window 322 and exposed through the window 322. There may be a single window 322, so that the first network socket 251, the second network socket 522, and the power socket 342 are exposed through the same window 322. There may alternatively be a plurality of windows 322, so that the first network socket 251, the second network socket 522, and the power socket 342 are each exposed through one window 322.

The computer host 30 in the third embodiment may also be packed by using the packing box 20 in the second embodiment to form a package assembly of the computer host 30.

Figure 15:
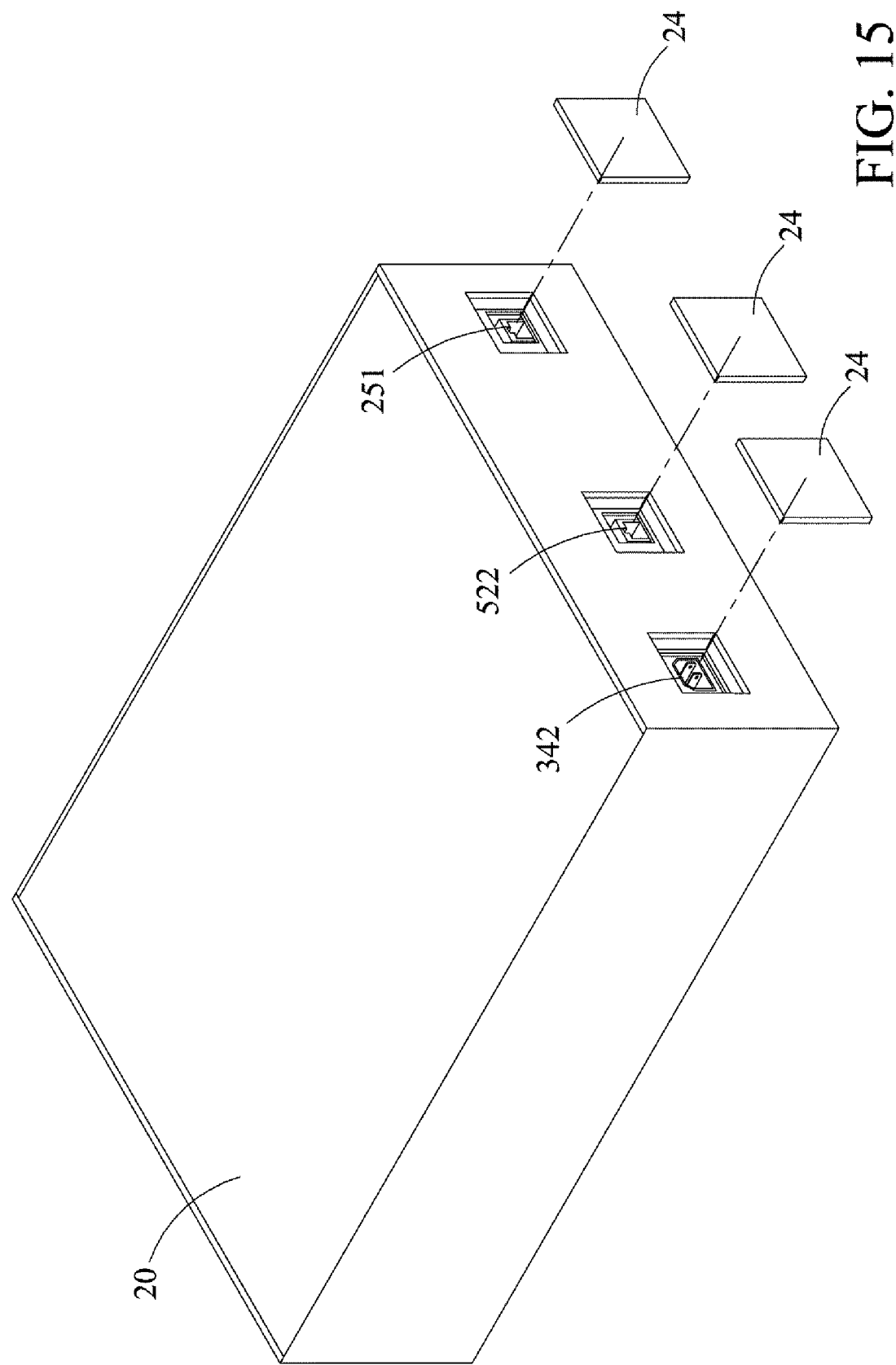
FIG. 15 is a three-dimensional diagram of an electronic device package assembly according to a fourth embodiment of this disclosure.

FIG. 15 shows an electronic device package assembly according to a fourth embodiment of this disclosure, including an electronic device and a packing box 20. A computer host 30 is used as an example to describe the electronic device in the fourth embodiment.

As shown in FIG. 14, the packing box 20 is configured to accommodate the computer host 30 in the fourth embodiment. The packing box 20 includes at least one opening hole 22. A position of the at least one opening hole 22 corresponds to the second network socket 522 and the power connector 300, and may further correspond to the first network socket 251. In the fourth embodiment, the packing box 20 includes three opening holes 22. Positions of the opening holes 22 respectively correspond to the first network socket 251, the second network socket 522, and the power connector 300.

As shown in FIG. 14, when the packing box 20 wraps the computer host 30, the second network socket 522 and the power connector 300 are still exposed, so that a network cable and external power EP can be connected. Therefore, when the packing box 20 is not unpacked, the embedded controller 500 can still execute the data writing procedure to update firmware of the target electronic element. That is, after the computer host 30 has been manufactured and is packed, the firmware of the target electronic element is still able to be updated, and the packing box 20 does not need to be unpacked to take out the computer host 30.

The packing box 20 in the fourth embodiment also includes the sealing element 24, the buffer element 21, the separation element 26, and the reinforcement element 28 as described in the second embodiment. The separation element 26 is instead disposed between the casing 32 and the inner side surface 20a of the packing box 20. The separation element 26 is also configured to provide a tubular channel 261, so that the tubular channel 261 extends from the edge of the opening hole 22 toward the second network socket 522 or the power connector 300, and the separation element 26 surrounds the second network socket 522 or the power connector 300. In this way, a function of the separation element 26 is to enable an external environment to touch only the second network socket 522 or the power connector 300 through the opening hole 22 and not to touch another part of the computer host 30.

Through the foregoing electronic devices composed of motherboards 10, as long as standby power and a network connection are provided, on-board data update can be performed without disassembling the electronic device, especially a computer host that has been assembled. After the electronic device is further combined with a packing box 20, on-board data update is further performed when the packing box 20 is not unpacked. Therefore, it is helpful for management of the electronic device in stock.

What is claimed is:

1. An electronic device for updating on-board data of power off status, comprising a board, a system electronic circuit, a power connector, and a first network socket, wherein the system electronic circuit is disposed on the board, the power connector is disposed on the board and is electrically connected to the system electronic circuit to receive working power and output standby power, and the first network socket is electrically connected to the system electronic circuit; and the electronic device for updating on-board data of power off status further comprises:
   at least one rewritable memory, disposed on the board, wherein the rewritable memory comprises a target storage area;
   an embedded controller and a second network socket, disposed on the board, wherein the embedded controller is electrically connected to the rewritable memory and receives the standby power via the power connector, and the embedded controller comprises a second network interface that is connected to the second network socket to receive a writing command and a binary file;
   after receiving the standby power, the embedded controller executes a data writing program to receive the writing command and the binary file via the second network socket and the second network interface, and writes the binary file into the target storage area of the rewritable memory by using the data writing program; and
   a casing and a power supply unit, wherein the power supply unit and the board are installed inside the casing, the power supply unit comprises a power socket and an output connector, the power socket is configured to receive external power to be converted into the working power, and the output connector is configured to connect to the power connector to output the working power to the power connector; and the casing comprises at least one window, and the first network socket, the second network socket, and the power socket are disposed corresponding to the window and are exposed through the window.

2. The electronic device for updating on-board data of power off status as claimed in claim 1, wherein before the writing the binary file into the target storage area of the rewritable memory, the embedded controller executes a verification procedure on the binary file to confirm correctness of the binary file.

3. The electronic device for updating on-board data of power off status as claimed in claim 2, wherein the binary file at least comprises a header, content, a checksum, and a version number.

4. The electronic device for updating on-board data of power off status as claimed in claim 3, wherein the embedded controller determines whether the header belonging to the binary file exists to confirm whether a received file is the binary file.

5. The electronic device for updating on-board data of power off status as claimed in claim 3, wherein the embedded controller executes a checksum operation on the binary file to determine whether a result of the checksum operation conforms to the checksum of the binary file.

6. The electronic device for updating on-board data of power off status as claimed in claim 3, wherein the binary file comprises a target identification message corresponding to the rewritable memory.

7. The electronic device for updating on-board data of power off status as claimed in claim 1, wherein the embedded controller executes a host end procedure used to allow a client to be connected to the embedded controller via the second network interface and the second network socket to execute the data writing program.

8. The electronic device for updating on-board data of power off status as claimed in claim 7, wherein the host end procedure executes a web page service, sets a local connection address, and provides, through the web service, a menu to be displayed on the client.

9. The electronic device for updating on-board data of power off status as claimed in claim 7, wherein the menu is used to allow the client to upload the binary file and the writing command.

10. The electronic device for updating on-board data of power off status as claimed in claim 7, wherein after the executing a data writing job, the embedded controller returns, to the client, a data writing result to be displayed in the menu.

11. An electronic device package assembly, comprising:
the electronic device of claim 1. the binary file into the target storage area of the rewritable memory by using the data writing program; and
a packing box, configured to accommodate the electronic device, wherein the packing box comprises at least one opening hole, and a position of the at least one opening hole corresponds to the second network socket and the power connector.

12. The electronic device package assembly as claimed in claim 11, further comprising:
a sealing element, configured to close the at least one opening hole.

13. The electronic device package assembly as claimed in claim 11, further comprising a separation element, provided with a tubular channel, wherein the tubular channel extends from an edge of the opening hole toward the second network socket or the power connector, so that the separation element surrounds the second network socket or the power connector.

14. The electronic device package assembly as claimed in claim 11, further comprising a reinforcement element, combined on an inner side surface of the packing box and surrounding the opening hole.

15. The electronic device package assembly as claimed in claim 14, wherein the reinforcement element protrudes in the opening hole along a radial direction of the opening hole.

* * * * *